United States Patent [19]

Toledo-Flores et al.

[11] Patent Number: 4,832,972

[45] Date of Patent: May 23, 1989

[54] PROCESS FOR PRESERVATION OF FISH

[75] Inventors: Luis J. Toledo-Flores, Juchitan, Mexico; Robert R. Zall, Ithaca, N.Y.

[73] Assignee: Cornell Research Foundation, Inc., Ithaca, N.Y.

[21] Appl. No.: 178,096

[22] Filed: Apr. 6, 1988

[51] Int. Cl.$^4$ .............................. A23B 4/08; A23L 3/36
[52] U.S. Cl. ................................... 426/327; 426/332; 426/335; 426/524
[58] Field of Search ............... 426/327, 332, 335, 643, 426/524

[56] References Cited

U.S. PATENT DOCUMENTS

| | | | |
|---|---|---|---|
| 2,383,907 | 8/1945 | Beechem et al. | 426/332 |
| 2,554,625 | 5/1951 | McFee et al. | 426/332 |
| 4,431,679 | 2/1984 | Crawford | 426/332 |
| 4,517,208 | 5/1985 | Crawford | 426/332 |

FOREIGN PATENT DOCUMENTS 61-124340 6/1986 Japan .................................. 426/327

OTHER PUBLICATIONS

Luis Javier Toledo-Flores, Ph.D., Thesis, Cornell University, Aug. 1987 (Extending Storage Life of Fresh Tropical Fish by Storage in Ice/Salt Mixtures Combined with Antimicrobial Treatments).
Kelleher, S. D., 1982, A Thermal Treatment for the Estension of Fresh Fish Shelf-Life, M. S. Thesis, Cornell University, Ithaca, N.Y.
Food Protection Report, Feb. 1988, p. 8, Professor Zall Cornell Univeristy Institute of Food Science.
Waldholz et al., Wall Street Journal, Oct. 22, 1987, Section 2, p. 41, col. 3.
Long, Susan S., Cornell News and Feature Service, Mar. 14, 1981 (Shelf Life of Fresh Fish Doubled: Excellent Quality Maintained).
U.S.A. Weekend/Mar. 25-27, 1988 (The Truth About Fresh-Fish Stories. There's a New Catch to Those Tales: Frozen Fish Can Be a Better Buy).
Reay et al., The Spoilage of Fish and Its Preservation by Chilling. *Adv. Food Res.*, 2:344 (1949).
Lee, C. M. et al., Comparison of Shelf Life and Quality of Mullet Stored at Zero and Subzero Temperature. *J. Food Sci.*, 49:317 (1984).
Pearson, S. F., The Application of Engineering Science to Fish Preservation. In "Advances in Fish Science and Technology", J. J. Connel (Ed.). Fishing News (Books) Ltd., London. (1980).
Peters, J. A. et al., Comparative Keeping Quality, Cooling Rates, and Storage Temperatures of Haddock Held in Fresh-Water Ice and in Salt-Water Ice. *Comm. Fish. Rev.*, 20(1):6 (1958).
Fey, M. S. Extending the Shelf Life of Fresh Fish by Potassium Sorbate and Modified Atmospheres at 0°-1° C., Ph.D. Thesis, Cornell University, Ithaca, N.Y., (1980).
Fey, M. S. et al., Extending Self-Life of Fresh Wet Red Hake and Salmon Using $CO_2$-$O_2$ Modified Atmosphere and Potassium Sorbate Ice at 1° C., *J. Food Sci.*, 47:1048 (1982).
Statham, A. et al., Effect of Potassium Sorbate On Spoilage of Blue Grenadier (Macruronus Novaezelandiae) as Assessed by Microbiology and Sensory Profiles. *J. Food Prot.*, 46:1084 (1983).
Anonymous, 1983, Fish Bleeding, Sorbate Preservation of Fillets Studied at Gloucester Lab., *Mar. Fish. Fev.*, 45(3):24.
Doesburg, J. J. et al., The Use of Sorbic Acid in Salted Fish. *J. Food Technol.*, 4:339 (1969).
Robach, M. C. et al., Inhibition of Vibrio Parahaemolyticus by Sorbic Acid in Sorbic Acid in Crab Meat (List continued on next page.)

*Primary Examiner*—George Yeung
*Attorney, Agent, or Firm*—Jones, Tullar & Cooper

[57] ABSTRACT

A low-cost process for preserving fish for periods up to five weeks without deterioration or loss of quality comprises the steps of subjecting freshly caught fish to one or more antimicrobial treatments, supercooling the treated fish in an ice/salt mixture to a temperature of from about −2° C. to −5° C. and storing the supercooled fish in a non-frozen state at temperatures in the range of about 0° C. to about −5° C.

21 Claims, 5 Drawing Sheets

OTHER PUBLICATIONS and Flounder Homogenates. *J. Food Prot.,* 41:669 (1978).

Maha, M. et al., Combination of Potassium Sorbate and Irradiation Treatments to Extend the Shelf-Life of Cured Fish Products, In "Combination Processes in Food Irradiation". National Atomic Energy Agency, Jakarta, Indonesia, [FSTA 14(8):8R484].

Chung, Y. M. et al., Inhibition of Microbial Growth in English Sole (Parophrys Retulus), *J. Food Prot.,* 44:66 (1981).

Uchiyama, H. et al., Partial Freezing as a Means of Keeping Freshness of Cultured Rainbow Trout, *Bull. Tokai Reg. Fish. Res. Lab.,* 95:1 (1978b).

Uchiyama, H. et al., A Simple and Rapid Method for Measuring K Value, a Fish Freshness Index. *Bull. Jap. Soc. Sci. Fish.,* 50:263 (1984).

Ziecik, M., An Application of Superchilling for the Protection of Raw Fish Materials and Products in Container Transport Systems, *Refrig. Sci. Technol.,* 6:219 (1973).

Torry Research Station Steering Committee, 1965, Superchilled Fish, in "Torry Research Station Annual Report on the Handling and Preservation of Fish and Fish Products, 1964", Her Majesty's Stationary Office, Edinburgh, U.K.

Torry Research Sation Steering Committee, 1967, Superchilled Fish, in "Torry Research Station Annual Report on the Preservation and Handling of Fish and Fish Products, 1966", Her Majesty's Stationary Office, Edinburgh, U.K.

Uchiyama, H. et al., Partial Freezing as a Means of Preserving Fish Freshness—I Changes in Free Amino Acids, TMA-N, ATP and Its Related Compounds, and Nucleic Acids during Storage. *Bull. Jap. Soc. Sci. Fish.,* 40:1145 (1974).

Dyer, W. J., Deterioration and Storage Life of Frozen Fish, In "Low Temperature Biology of Food Stuffs", J. Hawthorn (Ed.), p. 429, Pergamon Press, New York, (1968).

Saito, T., et al., A New Method for Estimating the Freshness of Fish, *Bull. Jap. Soc. Sci. Fish.,* 24:749 (1959).

Scarlatti, E., System for Preserving Fresh Fish on Board Deepwater Vessels, in "Fish Handling and Preservation", OEDC, Paris (1965).

Scarlatti, E., Results on the Storage and Transport of Fish in the Holds of Portuguese Fishing Vessels Using Superchilling Equipment, Proc. of the 12th International Congress of Refrigeration, Madrid (1967).

Thrower, S. J., Handling Fish–U.S. Conference Looks at the Basics and Beyond, *Aust. Fish.,* 41(3):38 (1982).

Liston, J. Microbiology in Fishery Science, In "Advances in Fish Science and Technology", J. J. Connell (Ed.), p. 138, Fishing News (Books) Ltd., London (1980).

Curran, C. A. et al., Quality Changes During Iced Storage of Three Commercially Important Species of Fish from Bahrain, *Trop. Sci.,* 23:253 (1981).

Nowlan, S. S. et al., Superchilling—a New Application for Preserving Freshness of Fish Fillets During Marketing, *Can. Inst. Food Sci. Technol. J.,* 7:A16 (1974).

Partmann, W., Some Experiences Concerning Superchilling of Fish, *Refrig. Sci. Technol.,* 1965-5:191 (1965).

Power, H. E. et al., The Chemical and Physical Characteristics of Cod Stored at Superchill Temperatures, In "Freezing and Irradiation of Fish", R. Kreuzer (Ed.), p. 104, Fishing News (books) Ltd., London, (1969).

Merritt, J. H., Superchilling on Board Trawlers, *Refrig. Sci. Technol.,* 1965-5:183 (1965).

Merritt, J. H. et al., Superchilling of Fish–the Position Today, *Mod. Refrig.,* May, p. 438 (1966).

Ming, Z., Application of Partial Freezing Technique on Fishing Vessels Operating in the South China Sea, *Refrig. Sci. Technol.,* 1981-4:259 (1981).

PROCESS FOR PRESERVATION OF FISH

This invention relates to the preservation of fresh fish for periods up to five weeks and more specifically the invention relates to a process for preservation of fish species that are found in tropical regions of the world and particularly the families including snappers (Lutjanidae), groupers (Serranidae), grunts (Pomadasyidae), and squirrelfish (Holocentridae).

BACKGROUND OF THE INVENTION

Tropical regions of the world have a rich diversity of marine life. Abundant families of demersal and pelagic fish exist in these regions. The most common families inhabiting the Caribbean Sea include snappers (Lutjanidae), groupers (Serranidae), grunts (Pomadasyidae), and squirrelfish (Holocentridae). Snappers greatly outnumber the other families in deepwater habitats.

About 28 percent of the world's fish catch, nearly 90 million tons, are found in tropical waters. However, because of improper handling, most of those fish spoil, resulting in huge losses of a nutritious food. Hence, fresh fish are seldom available in interior parts of tropical countries.

Bacterial attack has an effect on the keeping quality of the fish. In tropical areas, fish spoil within hours at ambient temperatures because bacteria on the surface of the fish, including the skin, rapidly multiply and invade the tissue inside, while a series of biochemical events taking place inside the fish accelerate the decomposition process.

Thus, there is a need to prevent the loss of a source of high-quality protein food and to make such fish products available in tropical regions in resource-poor countries where modern refrigeration systems are not widely available. A process that would keep tropical fish from spoiling would be beneficial in providing fresh fish to people inland and remote from fishing water sources who would otherwise have no way of getting fresh fish.

SUMMARY OF THE INVENTION

One object of this invention is a process for keeping and preserving freshly caught fish, including cold water fish and tropical fish, for periods of time up to about five weeks by: (a) subjecting freshly caught fish to an antimicrobial treatment to eliminate most of the bacteria present on the surface of the fish; (b) supercooling the antimicrobially treated fish using an ice/salt mixture to a temperature of about $-2°$ C. to about $-5°$ C.; and (c) storing the supercooled fish in an ice/salt mixture at a temperature of about $-0°$ C. to about $-5°$ C. preferably $-2°$ C. to $-5°$ C.; wherein said antimicrobial treatment comprises a thermalization treatment and/or an antimicrobial agent treatment.

Another object of the present invention is a process for preservation of fish which comprises:
(a) providing freshly caught fish;
(b) subjecting the fish to one or more antimicrobial treatments to eliminate most of the bacteria present on the surface of the fish, especially eviscerated fish;
(c) supercooling the treated fish;
(d) storing the supercooled fish in an ice/salt mixture at a temperature of about $-2°$ C. to about $-5°$ C.;
wherein the said antimicrobial treatments include thermal blanching treatments and/or spraying or dipping the fish with an antimicrobial agent.

A further object of the present invention is a process for preserving and storing fish that removes or destroys more than 90 percent of the bacteria on the fish surface prior to supercooling and storing the treated fish in and ice/salt mixture at a temperature of from about $-2°$ C. to about $-5°$ C. under conditions sufficient to maintain the fish without deterioration and without loss of quality and texture for up to about 4-5 weeks.

A yet further object of the present invention is to provide a fish preservation method which uses cooling but does not require the fish to be in the frozen state.

DETAILED DESCRIPTION OF THE INVENTION

Figure 1:
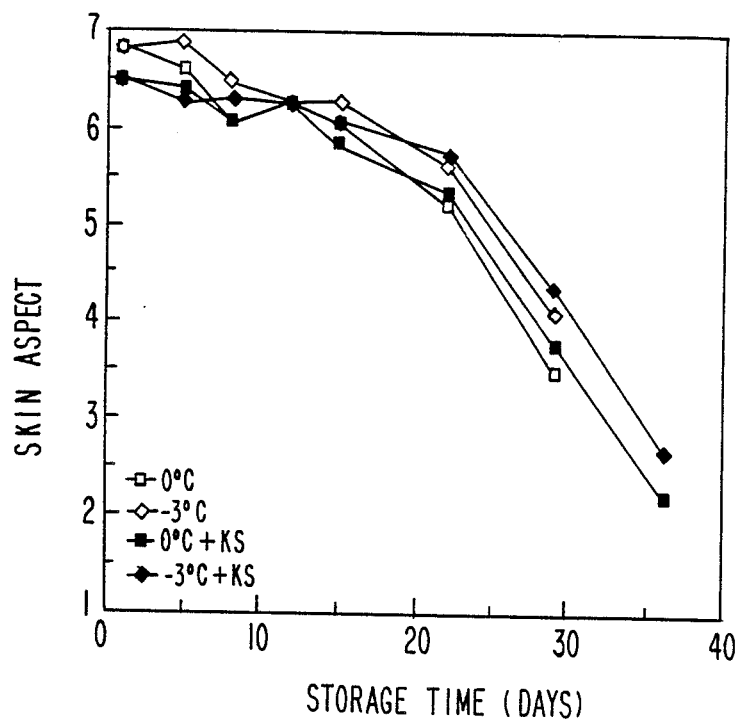
FIG. 1 is a plot of skin aspect ratings versus storage time (days) for queen snapper comparing potassium sorbate treated fish with the control (water dip only) at storage temperatures of 0° C. and $-3°$ C.

The family Lutjanidae is composed of 18 genera and 114 species (Druzhinin, 1970). These species are commonly known as snappers. Lutjanids are found throughout the four tropical regions of the world.

This invention relates to the low-temperature storage life of three snapper species: silk snapper (*Lutjanus vivanus*), queen snapper (*Etelis oculatus*), and cardinal snapper (*Pristipomoides macrophtalmus*). These species form the bulk of fish harvested in the deepwater fishery of Puerto Rico, where the experimental work was carried out.

The experiments described herein used fish captures from the deepwater fisher of Puerto Rico. Fish were subjected to different treatments before low temperature storage for a period of four weeks. A description of the treatments applied is presented in the following table:

TABLE 1

| Treatment | Description of the Treatment |
|---|---|
| Ice (control) | Storage in plain ice at 0° C. |
| Superchilling | Storage in ice/salt mixtures at −2, −3, and −5° C. |
| Sorbate | Dipping in 3 or 5% potassium sorbate solution for 5 min before storage in ice or ice/salt mixtures. |
| Chlorine dioxide | Dipping in 10 or 25 ppm chlorine dioxide solution for 2 min before storage in ice or ice/salt mixtures. |
| Blanching | Dipping in hot tap water at 70 or 90° C. for 5 sec before storage in ice or ice/salt mixtures. |

Fish samples were retrieved twice weekly. Chemical, microbial, and sensory changes were studied in these samples. The chemical analyses included determinations of trimethylamine (TMA), free amino acids (FAA), K value, protein extractability, riboflavin, and sodium chloride. Microbial growth was quantified by the aerobic plate count procedure. A trained panel evaluated the changes in the sensory attributes of the raw and the cooked fish. Data analysis was performed in an IBM mainframe computer, model 4031, utilizing the SAS ® software package. Fish utilized in the study were caught by commercial fishermen off the coast of Western Puerto Rico. After capture, fish were eviscerated, washed with sea water, and stored in crushed ice. Holding time in ice from capture to start of experiment was about one day. Weight of individual fish varied between 4 and 8 lbs.

Treatment fish were dipped in a 5% (w/v) food-grade potassium sorbate solution at room temperature for 5 min. Control fish were dipped in tap water for the same time period. After draining for one minute, fish were placed in containers between layers of plain crushed ice or a 1.6% ice/NaCl mixture (−3° C.). These containers were kept in a cold room at 0° to 2° C. Ice and ice/salt mixture were replaced twice weekly.

Fish samples were taken from the containers and washed with tap water to eliminate salt and ice residues. After filleting, a scale-on portion of about 50 g was placed in a sterile plastic bag to be used in the microbial analysis. The remaining portion of that fillet was skinned and saved for the chemical analysis. The second fillet was utilized in the sensory evaluation.

Aerobic plate count was determined according to the procedure described by Gilliland et al: Aerobic plate count. Ch. 4. In "Compendium of Methods for the Microbiological Examination of Foods," M. L. Speck (Ed.), p. 107. American Public Health Association, Washington, D.C., 1976 including the modifications for seafoods proposed by Liston and Matches: Fish, crustaceans, and precooked seafoods. Ch. 40. In "Compendium of Methods for the Microbiological examination of Foods," M. L. Speck (Ed.), p. 507. American Public Health Association, Washington, D.C., 1976.

The portion of the fillet reserved for the chemical analysis was cut into small pieces and minced for one minute in a Waring blender. Fifty grams of the mince were blended at high speed for 2 min with 150 ml 5% (w/v) trichloroacetic acid chilled to 0° C.-2° C. The residue was eliminated by gravity filtration through Whatman No. 2 paper. Trimethylamine (TMA) and free amino acid (FAA) were quantified in the extract. TMA was analyzed by the Dyer method (Dyer, 1945), as modified by Murray and Gibson (1972). FAA was quantified by determining the concentration of free tyrosine with the Folin-Ciocalteu reagent (Hawk et al., 1947). Color developed was read at 550 nm (Uchiyama and Kato, 1974).

Sensory evaluation was performed by a group of 10 graduate students from the Department of Animal Industry at the University of Puerto Rico. Panelists were trained in a month long fish storage trial during which they became familiar with the sensory attributes of fish under study and the scales used in the score sheet. Skinned fillets used to evaluate cooked fish were wrapped in aluminum foil and baked at 350° F. in a convection oven. Cooking time was between 30 and 40 min, depending on the fillet's size. Six intensity attributes were evaluated in the raw fish: skin aspect, flesh elasticity, flesh odor, gill aspect, gill odor, and flesh color. Cooked fish was evaluated with regard to 5 intensity and one hedonic attributes: meat color, firmness, juiciness, taste, saltiness, and overall acceptability. A seven point scale was used in all cases, with 7 representing best quality.

Figure 2:
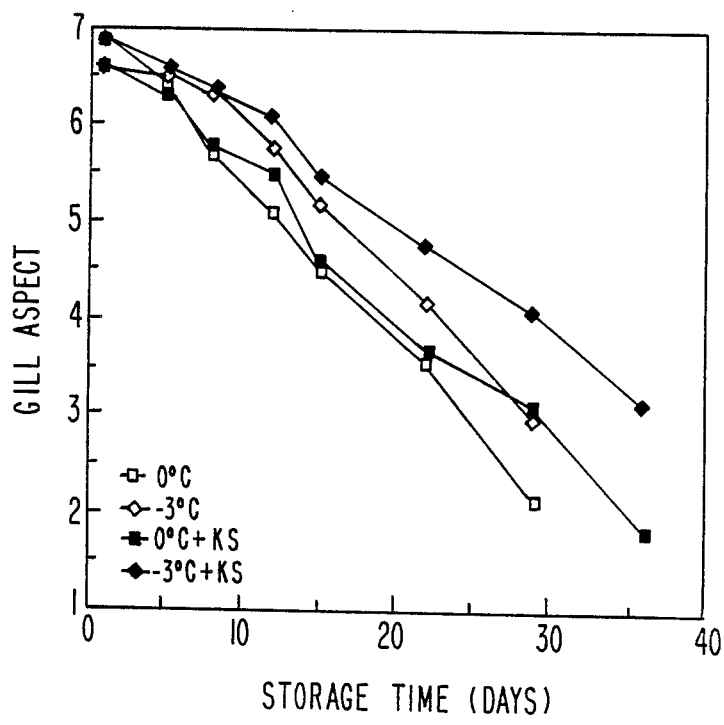
FIG. 2 is a plot of gill aspect ratings versus storage time (days) for raw queen snapper comparing potassium sorbate treated fish with the control (water dip only) at storage temperatures of 0° C. and $-3°$ C.

Queen snapper's skin retained a very good aspect for about 2 weeks, regardless of storage conditions (FIG. 1). Storage at −3° C. had a beneficial effect after 3 weeks. But the deterioration of skin aspect proceeded at the same rate for potassium sorbate (KS) treated and non-treated fish stored at both temperatures (FIG. 1). Gill aspect was a convenient attribute to evaluate fish freshness. Score decreases shown in FIG. 2 are almost linear for all storage conditions. Potassium sorbate was effective in retarding the deterioration of gill aspect when it was combined with −3° C. storage, especially after 2 weeks (FIG. 2). Gill odor and elasticity were also good attributes to monitor freshness.

Figure 3:
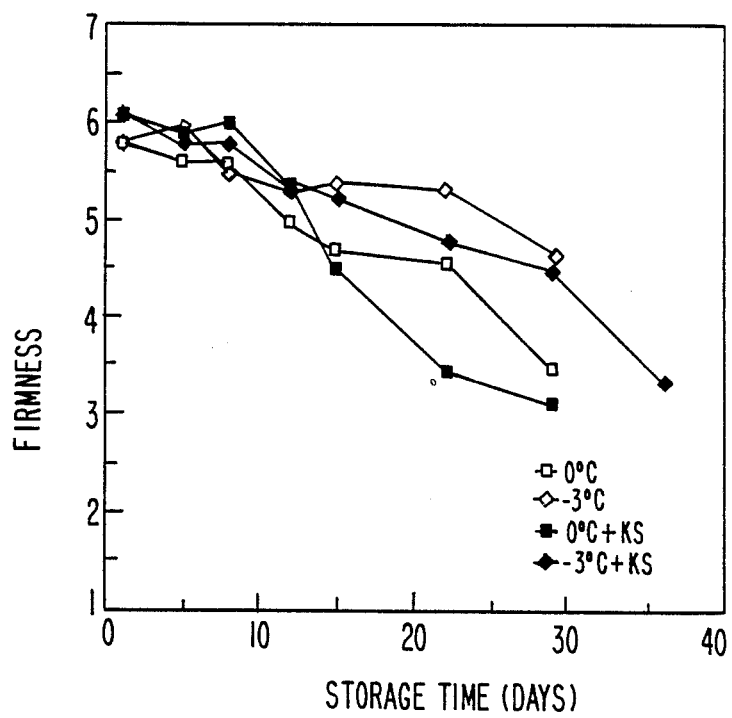
FIG. 3 is a plot of firmness versus storage time (days) for cooked queen snapper comparing potassium sorbate treated fish with the control (water dip only) at storage temperatures of 0° C. ad $-3°$ C.
Figure 4:
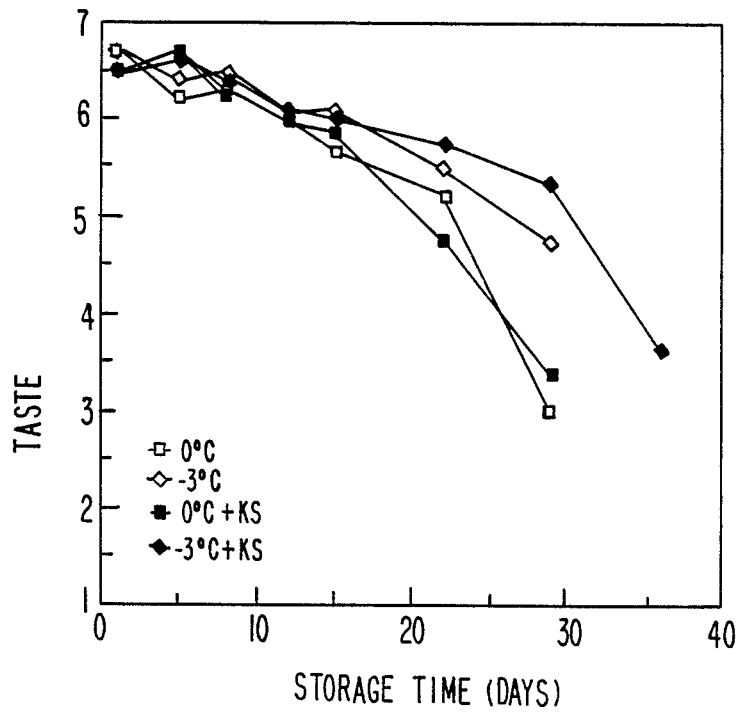
FIG. 4 is a plot of taste change versus storage time (days) for cooked queen snapper comparing potassium sorbate treated fish with the control (water dip only) at storage temperatures of 0° C. and $-3°$ C.
Figure 5:
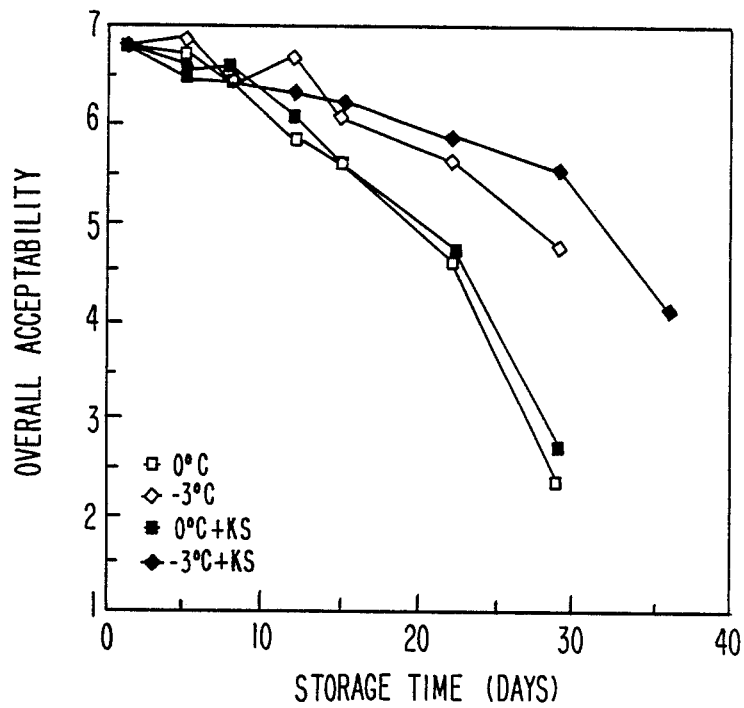
FIG. 5 is a plot of over all acceptability ratings versus storage time (days) for cooked queen snapper comparing potassium sorbate treated fish with the control (water dip only) at storage temperatures of 0° C. and $-3°$ C.
Figure 6:
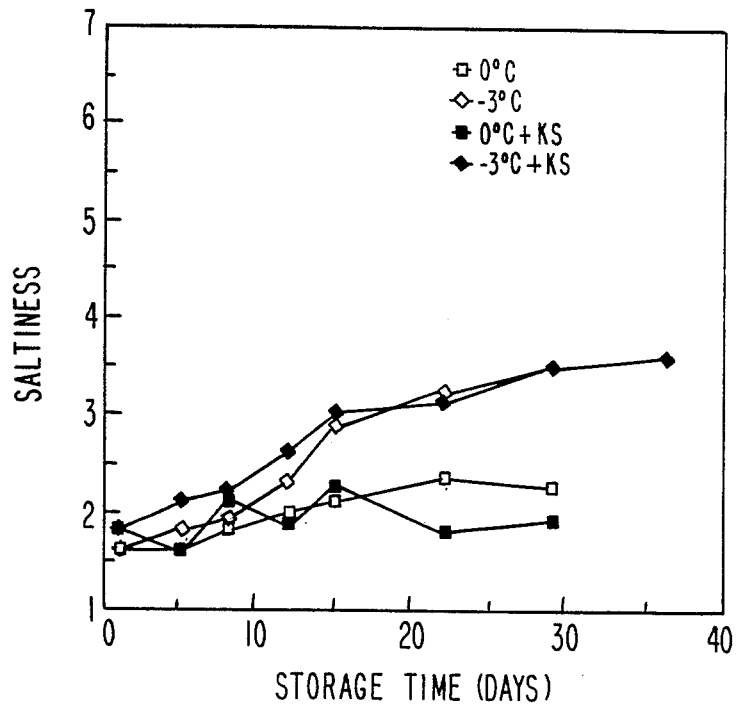
FIG. 6 is a plot of changes in saltiness versus storage time (days) for cooked queen snapper comparing potassium sorbate treated fish with control (water dip only) at storage temperatures of 0° C. and $-3°$ C.

Firmness of cooked queen snapper showed a variation of only 3 points in the 7-point scale after 4 weeks of storage. But differences in the holding temperatures showed an effect after 2 weeks of storage, with better firmness scores for fish stored at −3° C. (FIG. 3). Iced fish deteriorated fast after week 4 of storage and was not tested in week 5. No substantial difference in taste was detected by the panelists after 15 days of storage under the 4 different conditions (FIG. 4). No objectionable taste, and only a moderate loss of freshness were detected in the taste of the fish treated with KS and stored at −3° C. after 4 weeks. Iced fish, KS-treated and non-treated, were scored as slightly decomposed and slightly bitter after this time period (FIG. 4). Storage life of queen snapper was defined in this work as the time period during which average score of overall acceptability was 5.5 or higher. According to this, storage life of fish stored at 0° C. was 16 days. Lowering the storage temperature to −3° C. by the addition of 1.6% NaCl to ice extended this period to 23 days. This effect was further improved when combined with KS treatment to 29 days (FIG. 5). Flesh of fish stored in ice/salt mixture did gain salt. FIG. 6 shows that this could be noticed by the panelists after 2 weeks of storage.

Figure 7:
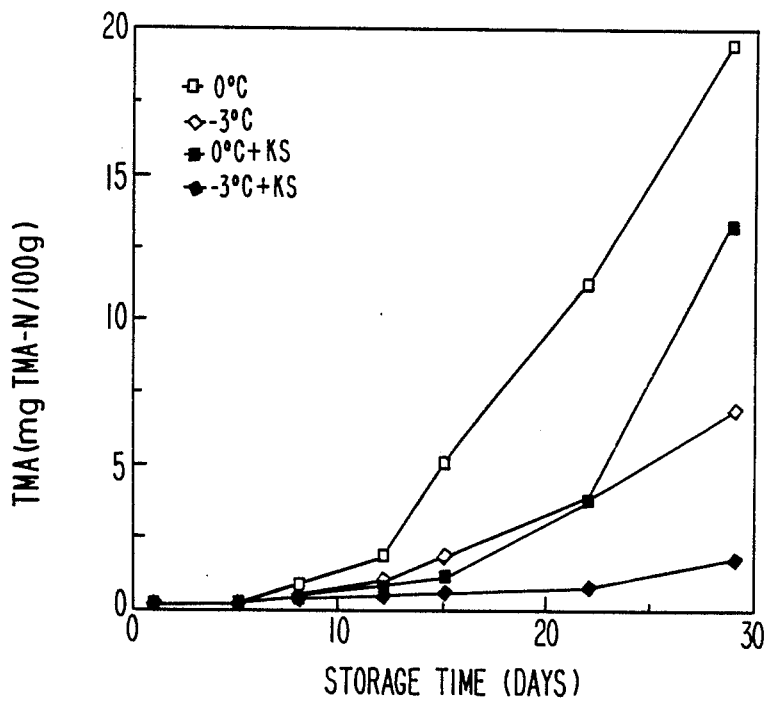
FIG. 7 is a plot of trimethylamine levels versus storage time (days) for queen snapper raw flesh comparing potassium sorbate treated fish with control (water dip only) at storage temperatures of 0° C. and $-3°$ C.
Figure 8:
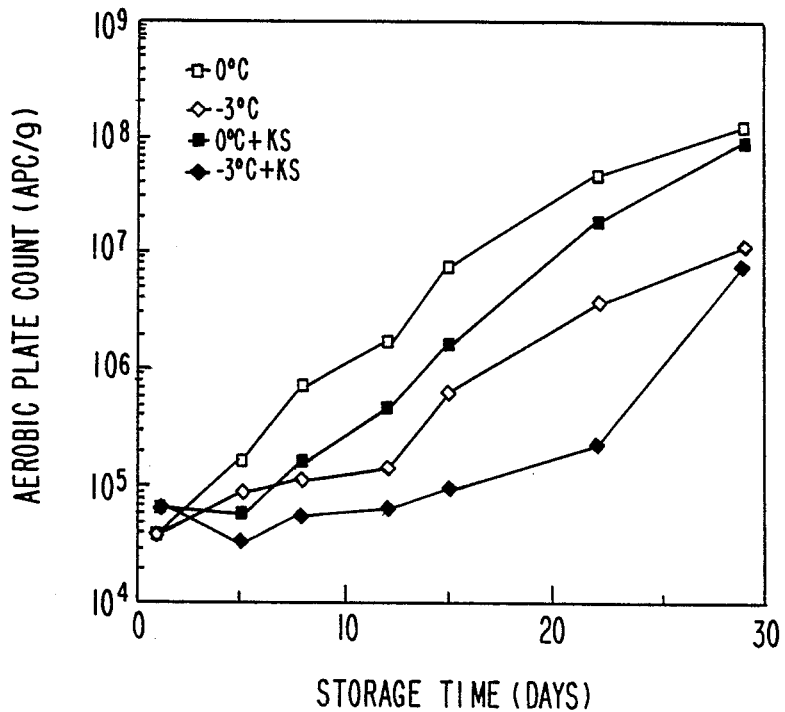
FIG. 8 is a plot of microbial growth in raw flesh versus storage time (days) for queen snapper comparing potassium sorbate treated fish with control (water dip only) at storage temperatures of 0° C. and $-3°$ C.

Storage at −3° C. greatly reduced the formation of TMA (FIG. 7). Values in good to medium quality fish are below 5 mg TMA-N/100g (Uchiyama et al, 1970). Fish treated with KS and stored at −3° C. retained levels well below this value after 4 weeks of storage. Temperature effect by itself, was not as effective as combined with KS to control TMA formation (FIG. 7). This could be attributed to the effectiveness of KS in maitaining low microbial numbers in fish flesh (FIG. 8).

Figure 9:
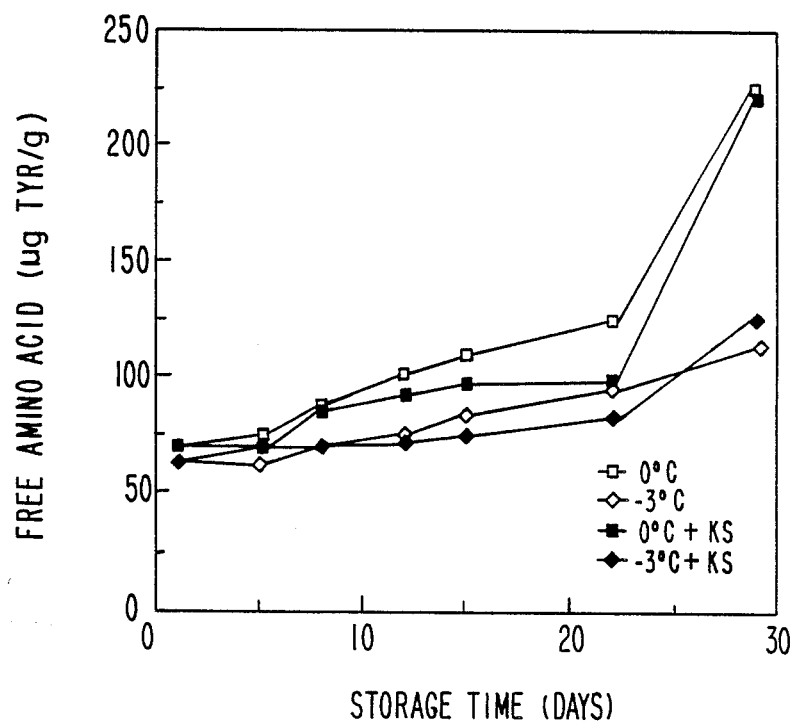
FIG. 9 is a plot of free amino acid levels in raw flesh versus storage time (days) for queen snapper comparing potassium sorbate treated fish with control (water dip only) at storage temperatures of 0° C. and $-3°$ C.

Microbial count showed an initial reduction in KS-treated fish. Count was kept almost constant for fish stored at −3° C. for 15 days. Iced fish treated with KS also showed lower counts than non-treated iced fish (FIG. 8). Aerobic plate count was in the order of $10^6$ after 2 weeks of storage at −3° C. Much lower count was reported by Lee and Toledo (1984) under similar conditions. FAA levels were maintained between 63 and 125 μg Tyr/g for fish held at −3° C., after 4 weeks of storage (FIG. 9). A low level of proteolytic activity occurred during this time, apparently. Values for KS-treated and non-treated fish stored at 0° C. were also low for 3 weeks, but increased substantially thereafter (FIG. 9).

Storage life of raw queen snapper (*Etelis oculatus*) in ice, 16 days, can be extended by storing fish in a 1.6% NaCl/ice mixture, which decreases the storage temperature to −3° C. Storage life under the below zero condition is 23 days.

Treating fish in a 5% potassium sorbate solution by dipping for 5 min, combined with storage at −3° C. extends storage life even further, almost doubling it from 16 to 29 days.

Freezing of fish to be marketed within 2-4 weeks, a common practice in Puerto Rico, could be changed to storing fish in ice/salt mixtures. Containers could be kept in cold rooms at 0° to 2° C., which would lower costs. Potassium sorbate treatment provides additional protection against spoilage.

The value of antimicrobial treatments combined with the superchilled storage was effective as shown in summary table 1.

TABLE 2

| Snapper Species | Treatment Conditions | | | | |
|---|---|---|---|---|---|
| | 0° C. | −3° C. | −3° C./5% Sorbate | −3° C./ 10 ppm $ClO_2$ | −3° C./90° C. Blanching |
| Queen | 16.0+ | 23.3 | 31.7 | 28.9 | 30.8 |
| Cardinal | 15.8 | 21.6 | 29.2 | 32.2 | 35.3 |
| Silk | 16.2 | 22.2 | 30.8 | 35.3 | nd* |

+Storage life (days)
*Not determined

Other treatment/storage temperatures were slightly less effective than those shown in Table 1. These include for example storage temperatures of about 0° C. to −3° C.

With reference to Table 2, it is seen that the storage life of the three snapper species was extended from about two weeks in ice to three weeks by the combination of the antimicrobial treatments and superchilling. The selection of a treatment for practical application would have to consider additional factors like cost, availability of the product (does not apply to blanching), toxicity (does not apply to blanching), and ease of application on board.

The formation of TMA—the compound responsible for the "fishy" taste—was substantially reduced by storage at superchilling temperatures. The combination of any of the antimicrobial treatments, with the exception of the 3% potassium sorbate treatment, and superchilling was effective, reducing TMA levels to less than 5 mg TMA-N/100 g after four weeks of storage. This level was found to be the upper limit for snapper meat acceptable eating quality. Lower TMA levels were the result of reduced microbial numbers in the treated fish.

Low TMA levels were reflected in taste scores. Sensory data showed that taste of the superchilled fish was superior to taste of iced fish, especially after two weeks of storage. Similarly, taste of fish treated with any of the antimicrobial treatments mentioned above and then superchilled was superior to taste of untreated, superchilled fish.

Application of a 25 ppm chlorine dioxide treatment resulted in the presence of an off-flavor in the cooked fish. However, this off-flavor disappeared after three weeks of storage.

With respect to texture, storage in the ice/salt mixture at −3° C. reduced the rate of FAA (Free Amino Acid) formation by 50% or more in the snapper meat, compared to iced controls. Protein extractability, on the other hand, was not affected by storage under superchilling conditions. Thus, texture of the cooked snapper meat was not adversely affected by the superchilling conditions, as shown by the sensory data. In fact, firmness of superchilled fish was superior to that of the iced controls. Application of the antimicrobial treatments improved the retention of firmness by reducing FAA formation in the snapper meat.

Regarding nutrition, generally, levels of riboflavin in the meat of the three snapper species were kept constant during storage. In some cases, particularly in cardinal snapper, concentrations were higher after the initial day of storage. This was attributed to the release of analytically undetectable vitamin molecules during low temperature storage.

Salts from the ice/salt mixture used to store fish at −3° C. was incorporated into the fish meat after twelve days of storage. However, salt content never reached a concentration of 1%, which is considered the level most palatable in cooked fish. Thus, salt uptake did not adversely affect the sensory quality of the snapper meat.

The most adequate sensory attributes of the raw fish to evaluate the age post-catch of the fresh fish were gill aspect and gill odor in queen and cardinal snapper, and skin aspect in silk snapper, whose red pigmentation was rapidly lost during storage in ice and ice/salt mixtures.

While the inhibitory effect of thermal blanching and the use of sorbic acid and sorbate salts on microorganisms is known, there has been no suggestion for a process combining these steps with steps for "supercooling" and storage of fish in ice/salt mixtures. The process of the instant invention, not only is advantageous in preserving fresh fish for longer periods of time, but is applicable to both cold water fish and tropical fish. In one sense, it is more difficult to control microorganisms on cold water fish because the microorganisms have adapted to the colder temperatures. A further advantage allows the treated fish to be chilled to below the freezing point of water without the fish being frozen i.e. superchilling step. The combined steps is an advance over conventional processes in that it preserves the fish (fresh tasting and good quality) for as long as five weeks.

Although the specific examples teach only a limited number of antimicrobial treatments, the invention should not be construed only to the exemplified treatments. One skilled in the art will recognize that other antimicrobial agents, including for example quaternary ammonium salts, can be used in place of the antimicrobial treatments exemplified in the best mode examples. Other useful antimicrobial treatments include inorganic acids such as phosphoric acids, peroxide compositions and food grade organic acids and their water soluble salts. Examples of food grade organic acid antimicrobial agents include citric acid, malic acid, delta gluconic acid, lactic acid and the like. When the antimicrobial agent is sorbic acid, other water soluble salts may be substituted for the preferred potassium sorbate. In a similar fashion it will be recognized that the storage conditions for maintaining temperatures of about −5° C. to about 2° C. can also be achieved by means other than with an ice/salt mixture.

In using acid type antimicrobial agents or their water soluble salts the efficiency of the preservation treatment is increased by decreasing the pH. Useful treatments obtain at pH values of from about 4.5 to 5.4 with pH values of 4.85 to about 5.0 being preferred. The use of pH values outside the above ranges cause deterioration of the meat of fresh quality of the fish.

Also contemplated within the present invention process is the use of ice prepared from water containing small amounts of the above noted antimicrobial agents, preferably at concentrations of from about 0.5 to 3 percent. The most preferable type antimicrobial ice for preserving the antimicrobially treated fish is ice prepared from brine or from sea water. For example ice salt mixtures where the ice is prepared from water containing 1 to 2 percent potassium sorbate is advantageous either when the antimicrobial treatment is either a thermal blanching treatment or a treatment using a chemical antimicrobial agent. In the latter case, the antimicrobial agent in the fish treatment step and in the ice making step may be the same or different antimicrobial agent. An example of an adventageous treatment is a process where the thermalization treatment comprising blanching the fish with hot water at about 154° F. and supercooling and storing in an ice/salt mixture where the ice contains 1 to 3 percent of lactic acid or a salt of sorbic acid.

What is claimed is:

1. A process for the preservation of fish which comprises:
    (a) subjecting freshly caught fish to one or more treatments to eliminate bacteria present on the surface of the fish; wherein said treatment is selected from the group consisting of a thermalization treatment, an antimicrobial agent treatment or a combination thereof;
    (b) supercooling the treated fish with an ice-salt mixture to a temperature at from about −2° C. to about −5° C.;
    (c) storing the supercooled fish at a temperature of about 0° C. to about −5° C.

2. The process of claim 1 wherein the supercooled fish is stored in an ice-salt mixture at a temperature of about −2° C. to about −5° C.

3. The process of claim 1 wherein the treatment is a thermal blanching treatment which comprises dipping the fish in hot water at a temperature of about 194° F. for several seconds sufficient to destroy most of the bacteria present on the surface of fish.

4. The process of claim 1 wherein the treatment is an antimicrobial agent treatment which comprises contacting the fish with a solution of an antimicrobial agent in a concentration and for a period of time sufficient to destroy most of the bacteria present on the surface of the fish.

5. The process of claim 4 wherein the antimicrobial agent treatment comprises dipping or spraying the fish with a sorbic acid salt solution prior to supercooling and storage with an ice-salt mixture sufficient to maintain a temperature of about −2° C. to −5° C.

6. The process of claim 5 wherein the antimicrobial agent treatment comprises dipping the fish in a potassium sorbate solution in water of about 3 to 10 percent for a period of about 5 minutes.

7. The process of claim 4 wherein the antimicrobial agent treatment comprises dipping or spraying the fish with a chlorine dioxide solution prior to supercooling and storage with an ice-salt mixture at a temperature of about −2° C. to 5° C.

8. The process of claim 7 wherein the antimicrobial agent treatment is an antimicrobial solution of chlorine dioxide in water at a concentration of about 10 to about 35 ppm.

9. The process of claim 2 wherein the treatment comprises spraying an antimicrobial agent on the surface of the fish.

10. The process of claim 4 wherein the antimicrobial agent is a quaternary ammonium antimicrobial agent.

11. The process of claim 4 wherein the antimicrobial agent is a food grade organic multicarboxylic acid or an hydroxy-containing multicarboxylic acid.

12. The process of claim 11 where the food grade is selected from the group consisting of citric acid, malic acid, delta gluconic acid and lactic acid.

13. The process of claim 4 where the antimicrobial agent is an aqueous solution having a pH of from about 4.5 to about 5.4.

14. The process of claim 1 wherein the ice in the ice-salt mixture used for supercooling the fish is prepared from water or brine containing 1 to 3 percent antimicrobial agent.

15. The process of claim 1 wherein the preserved fish are tropical fish.

16. The process of claim 5 wherein the preserved fish are species of the genus Lutjanidae, Serranidae, Pomadasyidae and Holocentridae.

17. The process of claim 3 wherein the preserved fish are tropical fish.

18. The process of claim 17 wherein the tropical fish are members of the snapper variety.

19. The process of claim 2 wherein said ice contains an antimicrobial agent at a concentration of from about 0.5 to 3 percent.

20. The process of claim 3 wherein the said ice contains 0.5 to 3 percent of lactic acid or sorbic acid or a water soluble salt thereof.

21. The process of claim 1 wherein the supercooled fish is stored in an ice-salt mixture.

* * * * *